United States Patent [19]

DeRosa

[11] 4,010,460

[45] Mar. 1, 1977

[54] ALERTING SYSTEM WITH MEMORY

[75] Inventor: James DeRosa, Westford, Mass.

[73] Assignee: Bell & Howell Company, Chicago, Ill.

[22] Filed: Dec. 12, 1974

[21] Appl. No.: 532,059

[52] U.S. Cl. ................................ 340/311; 325/55; 325/64; 340/164 B; 340/171 R

[51] Int. Cl.² ........................................ H04M 11/02

[58] Field of Search ............... 340/311, 312, 164 B, 340/171 R; 325/55, 64; 179/41 A

[56] References Cited

UNITED STATES PATENTS

| | | | |
|---|---|---|---|
| 3,510,864 | 5/1970 | McDonald | 340/311 |
| 3,581,013 | 5/1971 | Muller | 325/64 |
| 3,742,481 | 6/1973 | Nickerson | 340/311 |
| 3,768,090 | 10/1973 | Williams | 340/311 |

*Primary Examiner*—John W. Caldwell
*Assistant Examiner*—James J. Groody
*Attorney, Agent, or Firm*—Alfred H. Rosen; Frank A. Steinhilper

[57] ABSTRACT

A paging receiver is described having page memory for automatically storing a page if the user does not reset the receiver within a prescribed time interval after an alert signal is started. After a page is stored it can be recalled from page memory by operating the reset button.

14 Claims, 2 Drawing Figures

ALERTING SYSTEM WITH MEMORY

BACKGROUND OF THE INVENTION

This invention relates in general to alerting devices employed in a system for alerting one or some of a large number of persons from a central paging station. In practice, for example, a caller of such a person may reach the central station by telephone, and the paging station may signal to the person via a radio common carrier (RCC) link. The invention thus relates more particularly, by way of example, to personal paging devices which can be carried on the person of a user, for response to space-transmitted calling signals such as radio waves. Alerting signals provided by such devices may be audible, visible or tactual (e.g.: vibratory), and alerting devices are known which give the user a choice of one or more alerting modes. Whatever alerting mode or modes are employed in a particular alerting device, the user must be wearing the alerting device, or at least be sufficiently close to it to perceive the alerting signal, in order for the alerting device to accomplish its purpose. This invention is addressed to situations in which a user of an alerting device which is energized to receive calling signals nevertheless fails for one reason or another to perceive an alerting signal that is provided by the device in response to a calling signal.

In the art of paging persons by means of portable alerting devices, such as radio receivers carried on the person that are responsive to an assigned carrier frequency, it is known to modulate the carrier with a sequence of calling frequencies, or "tones," for the purpose of signalling to subscribers with unique combinations of tones, for example, to address a particular subscriber, or to broadcast a particular message. A known two-tone paging system uses two tones selected in a coded sequence from an array of available tones. In another system, five tones are sent out (i.e.: modulate the carrier) in a coded sequence, but the number of tones used in a given coded sequence is not critical. In any system, each individual receiver is responsive to a selected one or few of all the possible useful codes. In a five tone paging system which is in common use, each tone last 33 milliseconds, and there is a 35 millisecond gap between pages, resulting in $(5 \times 33) + 35 = 200$ milliseconds for a complete page. Such a 5-tone paging system allows five pages per second. Thus, an alerting device in such a system has one-fifth of a second to receive a calling or paging signal and to provide an alerting signal in response to it. The alerting signal can, however, have a duration which is independent of the duration of the paging signal.

It is known according to U.S. Pat. No. 3,742,481 to disable an audio calling device in a radio pager, and to store the calling information so that it can be reproduced when desired. In the system of that patent this feature is used when the user does not wish to be disturbed or to cause a disturbance when the pager is alerted. When this feature is used, the pager is on, but will not emit an alerting signal. When the need for silence has passed, the pager is reset, and the alerting signal is furnished if a call has been received during the silent period. A practical defect of that system is that the user may forget to reset the pager to the condition for emitting an alerting signal in response to a calling signal, and when that happens the alerting device becomes useless, in a practical sense. The purpose of establishing a RCC link, which is to reach its subscribers with a minimum of delay, is thereby frustrated, and a user who forgets to reset a pager from the stored information mode to the alerting mode might just as well limit his or her interest to a telephone answering service. Understandably, operators of RCC Paging Networks and those offering similar services prefer not to supply their subscribers with devices that have the capability to frustrate the service intended to be rendered, and there is a requirement for an alerting device which is more reliable from a system-servive point of view.

GENERAL NATURE OF THE INVENTION

Alerting devices of the kind that is exemplified by radio pagers are provided with some means to terminate an alerting signal and to set the device in condition to respond to another paging or calling signal. Frequently, that means is a manually-operable switch labelled "reset"; and conveniently that switch is of the momentary-contact type. Upon perceiving an alerting signal, the user operates the reset switch. In accordance with the present invention, if within a prescribed time interval after initiating an alerting signal the alerting device does not receive from the user a signal (e.g.: operation of a reset switch) that the user has perceived the alerting signal, the device itself automatically terminates the alerting signal and stores in a page memory the information that a calling signal was received. This information will be retained in the page-memory until the alerting device is de-energized (by being shut-off, or depletion of its power supply if a battery is used), or until the user operates the reset switch. No special switch is required to enable the memory function. The alerting device automatically goes into the page-memory mode if it is not reset within the prescribed time duration of an alerting signal. Thereafter, if the reset switch is operated, the alerting device will again initiate an alerting signal, and in that situation the reset switch functions additionally and alternatively as a recall switch. A second operation of this switch will terminate the recalled alerting signal and will reset the device into condition for receiving another calling signal and providing an alerting signal in response to it. The action of operating the reset switch in response to a second alerting signal prevents the second signal from being stored in the memory. Thus an alerting device according to the invention enables the user to respond to the most recently-received paging signal. The full range of features of paging receivers is retained; for example, various modes of alerting signal, and various modes of tone response, and multiple-address features. In addition, if it is found to be useful, the feature according to which the alerting-signal generator can be temporarily disabled can also be included, and is within the scope of the invention, but that feature is not essential.

DETAILED DESCRIPTION OF THE DRAWING

Figure 1:
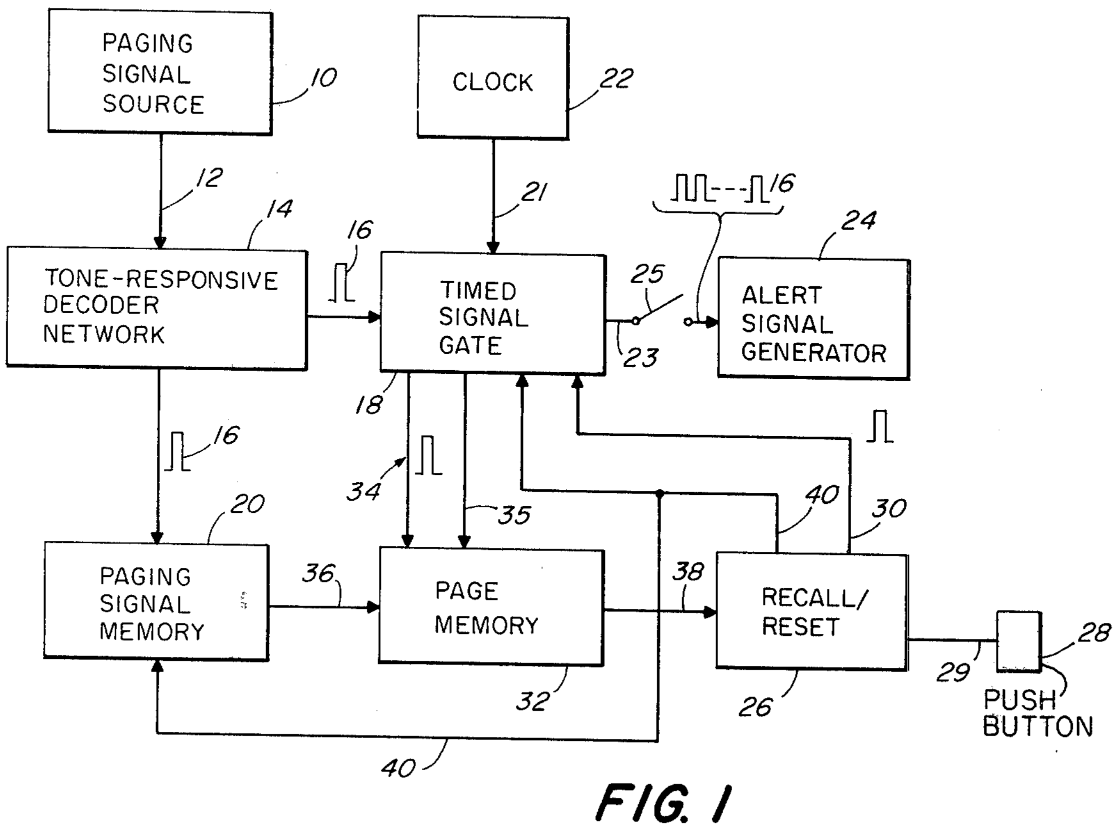
FIG. 1 is a block diagram of a page memory system.

A paging or calling signal source 10 may be an incorporated receiver of space-transmitted paging signals, or it may be a remote generator of paging signals. Paging or calling signals are supplied by this source to a tone-responsive decoder network 14 (which may be of any known form) over conductor means 12. If the signals supplied are those to which the system is intended to respond, the network 14 supplies a signal pulse 16 to a timed signal gate 18 and to a paging signal memory 20. Under control of a clock 22 via line 21 the gate 18 will activate an alert signal generator 24 for a prescribed interval of time. The connection 23 between the gate 18 and the alert signal generator 24 may include a switch 25, for disabling the alerting signal generator, if desired. If within the prescribed time interval, assuming the switch 25 is closed, a user of the system perceives the alert signal and activates recall/reset components 26, for example, via line 29 by operating a momentary-contact switch through a push-button 28, the recall/reset components will provide a signal over reset line 30 to the timed signal gate, to terminate operation of the alert signal generator. If on the other hand the reset button 28 is not operatd within the prescribed time interval, the gate 18 will at the end of that interval terminate operation of the alert signal generator 24 and send a memory-alert signal to the page memory components 32 over line 34. The paging signal memory 20, already containing the information that a paging or calling signal has been received, has set the page memory 32 into condition via line 36 to be set into a stored-page state and thereby provide a state changing signal to the recall/reset components 26 over line 38 in response to the memory-alert signal from line 34. The recall/reset components 26 are thus changed from the normal reset-function state to a state suitable for a recall function. If now a user operates the push-button 28, the recall/reset components will over recall line 40 initiate a cycle of operation of the timed signal gate 18 that is similar to the cycle which was initiated by the signal pulse 16. Simultaneously, the paging signal memory 20 is reset via recall line 40. Shortly thereafter, as will be explained in greater detail below, the page memory 32 is reset via line 35 to a non-stored-page condition. This will restore the recall/reset components 26 to the normal reset-function state existing before receiving the state-changing signal. Upon perceiving the alert signal the user can now terminate it with the push-button 28, via reset line 30.

Figure 2:
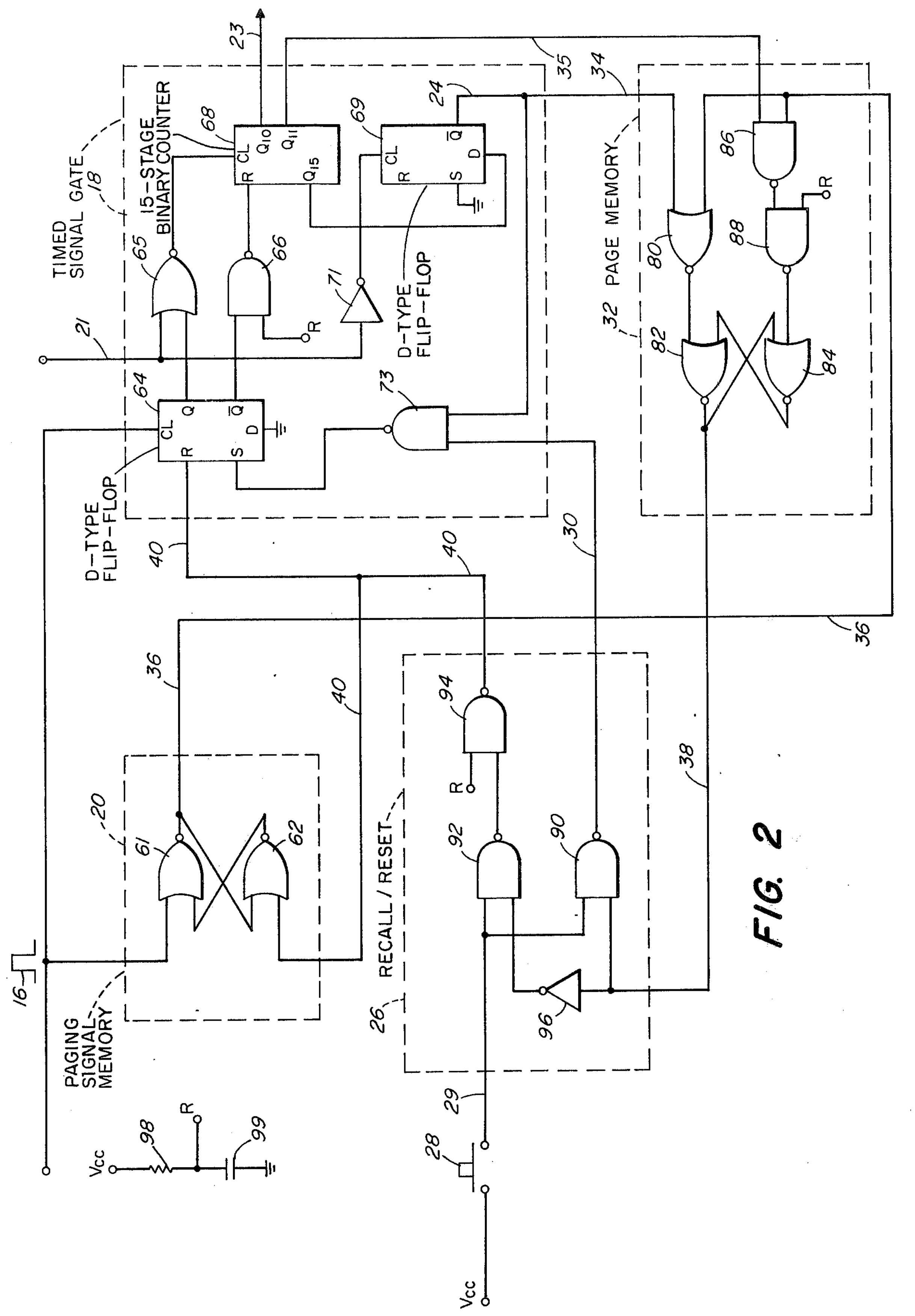
FIG. 2 illustrates logic circuitry that may be incorporated in blocks 18, 20, 26 and 32 of FIG. 1.

In FIG. 2 the paging or calling signal memory 20 includes a static flip-flop comprised of two cross-coupled NOR gates 61 and 62. When a pulse 16 occurs line 36 goes low setting the page memory 32 in condition to be put in a stored-page state via line 34. The timed signal gate block 18 includes a D-type flip-flop (DFF) 64, a NOR gate 65, a NAND gate 66, a 15-stage binary counter 68, a second D-type flip-flop (DFF) 69, an inverter 71, and a second NAND gate 73, interconnected as shown. When pulse 16 occurs at terminal CL, the Q-output of the first DFF 64 goes low, allowing the clock signal on line 21 to be fed into the binary counter 68 via the first NOR gate 65. Line 23 will have 16 pulses from output Q10 on it, to drive the alert signal generator 24. At the end of the 16th pulse, the Q15 output of the counter 68 goes high driving the D terminal of the second DFF 69 also high. When the next clock pulse to the CL terminal of DFF 69 goes high, the Q output goes low and, via line 34 and the second NAND gate 73 causes the set terminal S of the first DFF 64 to go high. This causes the Q-output of DFF 64 to go high and the Q output to go low, in turn cutting off the clock to the binary counter 68 and resetting all Q-states of the binary counter to low by feeding the Q low signal to the reset terminal R via the first NAND gate 66.

At the same time the low signal on line 34 is fed into the page memory 32, which contains a NOR gate 80, a pair of NOR gates 82, 84 cross-coupled, and first and second NAND gates 86, 88, respectively. When line 34 goes low simultaneously with line 36 being low, the page memory 32 is set into a stored-page state. If line 36 is high, a low signal on line 34 will not set the page memory into a stored-page state. Page memory is thusly set through decision of NOR gate 80, which sends a high signal to the cross-coupled NOR gates 82, 84. Line 38 goes low, thereby indicating a stored page to the recall/reset mechanism 26, which contains three NAND gates 90, 92, 94 and an inverter 96. To recall a stored page from the memory 32, the push-button 28 is pressed causing line 29 to go high. This high signal is applied to NAND gates 90 and 92 in shunt. If line 38 is then low, the decision process of the NAND gates 92, 94 will cause line 40 to go high, which in turn sets the Q-output of the first DFF 64 low, and that event starts the alert sequence of the binary counter 68. At the same time, the high signal on line 40 is fed into the paging or calling signal memory 20, causing line 36 to go high. The timed signal gate 18 is now going through its cycle, operating the alert signal generator 24, with the added operation of resetting the page memory 32 to a non-stored-page condition via line 35 in conjunction with the high signal on line 36. Line 35, which is connected to output Q11 of the binary counter, will go high after Q10 has gone high and gone low once, that is after the first of 16 cycles of the counter; this insures at least one alert signal from the generator 24 before the page memory 32 is reset. Other stages of binary-count could be used, if desired.

The decision process of NAND gates 86, 88 in the page memory 32 with lines 35 and 36 both high will switch line 38 to a high state. This sets the recall-reset mechanism 26 into a reset condition to enable manual termination of an alert signal via the push-button 28. When lines 38 and 29 are both high simultaneously, the decision process of NAND gate 90 will cause line 30 to go low, and via NAND gate 73 this applies a high signal to the set terminal S of the first DFF 64, to terminate the alerting sequence of the timed signal gate 18. Simultaneously, line 40 remains low and has no effect on DFF 64.

Vcc is the (+) operating voltage applied via resistor 98 and capacitor 99 to terminal R. This initiates the states of the various flip-flops in the circuit, such that an alerting sequence will occur on turn-on of the system, to indicate that the system is functioning. The system can be reset manually via push-button 28, or this turn-on alert signal will continue to the end of 16 pulses of the timed signal gate 18, without storing a page in the memory 32, for the reason that the turn-on event does not supply a signal pulse 16 to the paging signal memory 20.

I claim:

1. In an alerting device that is responsive to a calling signal to initiate an alerting signal and having reset means to terminate the alerting signal, means including time interval measuring means responsive to said calling signal to initiate said alerting signal, said time interval measuring means including means automatically to terminate said alerting signal after a prescribed time interval, said reset means having alternatively a normal reset state and a recall state into which said reset means can be set, an input for setting said reset means alternatively into said reset state or said recall state, said reset means having operator means, a reset output means and recall output means, means coupling said reset means via said reset output means to said time interval measuring means for terminating operation of the latter and thereby terminating said alerting signal if said operator means is operated when said reset means is in said reset state, means coupling said reset means via said recall output means to said time interval measuring means for initiating a time interval measuring cycle thereof and thereby initiating said alerting signal if said operator means is operated when said reset means is in said recall state, alerting signal memory means that is settable into a stored-page state, said time interval measuring means including means for setting said alerting signal memory means in said stored-page-state upon automatically terminating said alerting signal in the absence of operation of said operator means of said reset means during the time when the latter is in said reset state, said alerting signal memory means being coupled to said reset means via said input thereof for setting said reset means into said recall state when said alerting signal memory means is set into said stored-paged state.

2. Alerting device according to claim 1 including calling signal memory means having an input for receiving said calling signal and an output coupled to said alerting signal memory means, said calling signal memory means having a first output state and a second output state and means responsive to said calling signal to set said calling signal memory means from said first output state into said second output state, said calling signal memory means being effective when in second output state to set said alerting signal memory means into said stored-page-state.

3. Alerting device according to claim 2 including a coupling from said reset means to said calling signal memory means for setting said calling signal memory means from said second output state into said first output state when said reset means is operated while in said recall state.

4. Alerting device according to claim 3 including a coupling from said time interval measuring means to said alerting signal memory means for resetting said alerting signal memory means into a non-stored-page state after said reset means is operated while in said recall state thereby to set said reset means into said reset state.

5. Alerting device according to claim 1 including an alert signal generator for providing an alert signal to a user in response to said alerting signal, a coupling from said time interval measuring means to said alert signal generator, and means to set said coupling optionally in an open condition or a closed condition.

6. Alerting device according to claim 1 wherein said time interval measuring means includes a binary counter for generating a prescribed number of output pulses constituting said time interval measuring cycle, and clock means coupled to said counter for control thereof.

7. Alerting device according to claim 6 including an alert signal generator for providing an alert signal to a user in response to said alerting signal, and means coupling said output pulses as said alerting signal to said alert signal generator.

8. Alerting device according to claim 6 wherein said reset means when operated in said reset state terminates an operation of said binary counter prior to the production of said prescribed number of output pulses.

9. An altering device responsive to a calling signal for providing calling information to a user comprising, in combination, means responsive to the calling signal to provide an alerting signal during a predetermined time interval, memory means for storing said calling information, means responsive to said calling signal to set said memory means into an information-storage state, means operable within said time interval to terminate the alerting signal and the information storage state of the memory means, said means operable after the end of said time interval, in the absence of operation of said means within said time interval, to recall said calling information from said memory means.

10. An alerting device according to claim 9 wherein said memory means stores said information upon the ending of said time interval in the absence of operation within said time interval of said means to terminate.

11. An alerting device according to claim 9 having a common operator for said means to terminate and to recall.

12. An alerting device responsive to a calling signal for providing calling information to a user, including, in combination, means responsive to the calling signal to provide an alerting signal having a predetermined time interval;

memory means for storing said calling information;

operator means having first and second modes of operation and being operable in the first mode of operation during the predetermined time interval to terminate the alerting signal;

said memory means responsive to the nonoperation of said operator means during the predetermined time interval for automatically storing said calling information in the memory means and for setting the operator means into the second mode of operation; and the operator means being operable in the second mode of operation to recall the calling information from the memory means.

13. An alerting device according to claim 12 wherein the memory means has a stored page state and a non-stored page stage, the memory means being responsive in the non-stored page state to the non-operation during the predetermined time interval of the operator means in the first mode of operation to switch to the stored page state, and being responsive in the stored page state to operation of the operator means in the second mode of operation to switch to the non-stored page state.

14. An alerting device responsive to an encoded calling signal for providing calling information to a user, comprising:

means responsive to the encoded calling signal for decoding the calling signal to provide a decoded signal;

alert means responsive to the decoded signal for providing an alert signal having a predetermined duration;

operator means having first and second modes of operation and being operable in the first mode of operation during the duration of the alert signal for terminating the alert signal;

the alert signal providing means being automatically responsive to non-operation of the operator means during the duration of the alert signal to provide a memory alert signal upon end of duration of the alert signal;

memory means having a non-stored page state, and a stored page state for storing the calling information;

calling signal memory means responsive to the decoded signal for setting the memory means to a non-stored page state wherein the memory means is responsive to the memory alert signal for setting the memory means into the stored page state and for setting the operator means into the second mode of operation;

the operator means in the second mode of operation being operable to provide an alert enable signal; and the alert means being responsive to the alert enable signal to provide the alert signal.

* * * * *

UNITED STATES PATENT OFFICE

CERTIFICATE OF CORRECTION

Patent No. 4,010,460 Dated March 1, 1977

Inventor(s) James DeRosa

It is certified that error appears in the above-identified patent and that said Letters Patent are hereby corrected as shown below:

Column 1, line 44, "last" should read -- lasts --.

Column 2, line 10, "servive" should read -- service --.

Column 3, line 18, "operatd" should read -- operated --.

Column 6, line 3, "altering" should read -- alerting --.

line 45, "stage" should read -- state --.

Signed and Sealed this

*Eleventh* Day of *October 1977*

[SEAL]

*Attest:*

RUTH C. MASON
*Attesting Officer*

LUTRELLE F. PARKER
*Acting Commissioner of Patents and Trademarks*